United States Patent

Anderson

[15] 3,644,988

[45] Feb. 29, 1972

[54] METHOD OF FABRICATING COMPOSITE SUPERCONDUCTIVE CONDUCTOR

[72] Inventor: Glenn A. Anderson, Nashua, N.H.

[73] Assignee: Avco Corporation, Cincinnati, Ohio

[22] Filed: Nov. 12, 1969

[21] Appl. No.: 871,278

Related U.S. Application Data

[62] Division of Ser. No. 706,840, Feb. 20, 1968, Pat. No. 3,504,314.

[52] U.S. Cl. .......................29/599, 29/157.3 R, 174/126 CP, 174/128, 174/DIG. 16, 335/216

[51] Int. Cl. .......................H01c 11/00

[58] Field of Search ................29/599, 157.3 R; 174/126 CP, 174/128, DIG. 6; 335/216

[56] References Cited

UNITED STATES PATENTS

| | | | |
|---|---|---|---|
| 644,841 | 3/1900 | Allen | 29/157.3 R |
| 3,502,783 | 3/1970 | Aupoix et al | 174/DIG. 6 |
| 3,545,063 | 12/1970 | Mitchell | 29/157.3 R |
| 3,550,050 | 12/1970 | Albrecht | 174/128 |
| 3,468,021 | 9/1969 | Maier | 29/599 |
| 3,486,146 | 12/1969 | Williams | 29/599 X |
| 3,187,235 | 6/1965 | Berlincourt et al. | 335/216 |
| 3,349,169 | 10/1967 | Donadieu | 174/128 |

*Primary Examiner*—John F. Campbell
*Assistant Examiner*—Donald C. Reiley, III
*Attorney*—Charles M. Hogan and Melvin E. Frederick

[57] ABSTRACT

A ribbon-type multilayer composite superconductive conductor having a large surface area including internal surfaces exposed to the coolant. The internal passages are formed by winding a superconductive conductor on a first ribbon of conductive material disposed between and separating two outer ribbons of conductive material whereby in combination with said ribbons the space between adjacent turns of the superconductive conductor defines passages on both sides of said inner ribbon, the passages on one side preferably being disposed at an angle to the passages on the other side of the inner ribbon and the normal material intermediate the turns of the superconductive conductor providing a low-resistance shunt path in the event one or more turns are driven into the normal state.

2 Claims, 4 Drawing Figures

Patented Feb. 29, 1972 3,644,988

2 Sheets-Sheet 1

GLENN A. ANDERSON
INVENTOR.

BY Charles M. Hogan
Melvin E. Frederick
ATTORNEYS

GLENN A. ANDERSON
INVENTOR.

BY Charles M. Hogan
Melvin E. Frederick
ATTORNEYS

METHOD OF FABRICATING COMPOSITE SUPERCONDUCTIVE CONDUCTOR

This is a division of application Ser. No. 706,840 filed Feb. 20, 1968, now U.S. Pat. No. 3,504,314.

This invention relates to composite superconductive conductors and the method of manufacturing same. More particularly, the present invention relates to a method of making a multilayer ribbon-type superconductive conductor and the method of manufacturing same wherein the superconductive material is in substantially wire form and in combination with normal material defines internal coolant passages.

It is well known that, at a given temperature, a superconducting material loses its particular properties and behaves as a material having a conductivity of the normal type if the current flowing therethrough passes over a critical intensity $I_L$. The value of the critical current depends upon the flux density to which the material is subjected, and it is possible to obtain experimental curves representing $I_L$ as a function of the flux density B. Such a curve is represented in plain line in FIG. 1 of the accompanying drawings.

It has been found that, in the case of a coil made of a superconducting wire, the current cannot pass over a certain maximum value $I_M$ which is substantially smaller than the theoretical value $I_L$ of the curve of FIG. 1. The variation of the value $I_M$, as a function of the flux density B, is approximately represented by the curve in dotted line of FIG. 1. The difference between the curves $I_L$ and $I_M$ is due to the fact that superconducting materials may present internal electromagnetic perturbations which may cause the vanishing of the property of superconductivity, which effect is sometimes called "quenching." The internal perturbations are caused by several factors, among which are local heating and action of the external magnetic field, including that produced by the conductor itself and adjacent turns of this conductor.

This leads to a subsequent limitation of the maximum current to values much lower than theoretical values, and consequently to a limitation of the magnetic field of the coil.

The current $I_M$ may be increased by having the winding of the coils made not only of superconducting wires but of composite conductors including one or several conductors made of material presenting a good conductivity of normal type. To this end it has been proposed to insert superconducting wires in one or several grooves disposed in the outer surface of a ribbon made of copper. Another conventional conductor has been made of stranded wires of which one or more are made of copper, the others of superconducting material.

In the fabrication of superconductive coils, the characteristics of such coils can be greatly improved by providing the electrical conductor in the form of a stabilized superconductor comprising a ribbon of low-resistance normal metal in good thermal and electrical contact with superconductive material extending the length of the ribbon. As used herein, the term "stabilized superconductor" means one which in the presence of adequate cooling returns to the superconducting state following a disturbance, either self-generated (such as a flux jump) or externally generated (vibration, rapid external field change, temporary excess in current, etc.....) without requiring a reduction in excitation current.

In a magnet coil formed of superconducting wire alone (an unstabilized superconductor), if for any reason any part of the wire loses its superconducting characteristics and becomes normal, such as, for example, it reaches a temperature above its critical temperature, its critical current is exceeded, etc., the resistance introduced thereby not only destroys the superconducting mode of operation requiring at the least substantial shutdown of the coil, but also creates forces which may destroy the coil. By way of comparison, a coil comprising a stabilized superconductor is not subject to the above-noted defects and/or disadvantages. In addition to the above, a stabilized superconductor forming a coil can carry a current substantially equal to its short sample current without any adverse effects, whereas an unstabilized superconductor forming a coil can only carry a current which is substantially less than its short sample current. The short sample current referred to immediately hereinabove is the maximum current which a short sample of the superconductor will carry in the maximum magnetic field of the coil without going normal.

In one useful application, a stabilized superconductor comprised a plurality of superconductive wires 10 mils in diameter embedded in a copper ribbon. In another useful application, a stabilized superconductor comprised a ribbon of superconductive material bonded between two copper ribbons in a sandwich construction.

If a composite conductor as described immediately hereinabove is cool enough, no voltage will appear in the conductor until the critical current has been reached, and above the critical current, the voltage across the conductor will rise gradually with the current. Upon lowering the current, this voltage will disappear at the critical current.

If the composite conductor is not adequately cooled, a different situation exists. Consider first the case of an inadequately cooled composite superconductor that is not subject to instabilities or disturbances. In this case, no voltage appears until the current reaches the critical value. At this point, a sudden voltage will appear with the appearance in the circuit of a sizeable resistance. If the current is now lowered, a voltage persists across the conductor until a current much lower than that of the critical current is reached and the superconductor again becomes superconducting. This current can be referred to as the recovery current, and depends on the degree to which the conductor is cooled. If this same composite conductor is subjected to disturbances, or instabilities, then the situation is a little different. The disturbances are a destabilizing effect, and at currents above the recovery current and below the critical current the voltage across the conductor may be double valued. The magnitude of the voltage depends on which of the voltage values the coil will operate. However, it takes only one large disturbance to shift the operation from fully superconducting to fully normal. Thereafter, the current must be reduced to the value of the recovery current as determined by the degree of cooling present before superconductive operation is again attained.

It will now be seen that a stabilized superconductor should have as low a resistivity as possible consistent with ease of providing good electrical and thermal contact between the superconducting material and the normal material and that particularly, the rate of removal of heat from the conductor should be sufficient to provide a recovery current not substantially less than the critical current of the conductor. Thus, the recovery current of a stabilized superconductor can be used as a measure of its degree of stabilization; the closer the recovery current to the critical current, the greater the degree of stabilization. The actual minimum ratio of cross-sectional area of normal metal to superconductive material necessary to provide a stabilized conductor has not been finally established (it depends on various interdependent factors). However, a ratio of 4 to 1 of respectively copper and superconductive material has been found to provide a stabilized superconductor wherein only the smooth edges of the superconductor were exposed to the coolant.

In accordance with the principles of the present invention, prior art disadvantages and limitations can be substantially minimized if not completely eliminated while at the same time substantially reducing the cost of manufacturing superconducting coils which do not require special means to protect them in the event they go normal. Accordingly, it is a principal object of the present invention to provide improved superconductive conductors and techniques for fabricating such conductors and coils from such conductors.

Another object of the present invention is to provide a flexible composite superconductive conductor comprising superconductive material in direct thermal and electrical contact with the normal material.

A further object of the present invention is to provide an improved composite superconductive conductor and techniques for fabricating such conductors which do not require protective circuitry to protect it when formed into a magnet coil.

A still further object of the present invention is to provide a composite superconductive conductor having improved heat transfer characteristics.

A further object of the present invention is to provide a stabilized superconductive conductor having increased exposure to the superconducting environment when formed into a magnet coil.

A still further object of the present invention is to provide a stabilized superconductive conductor which not only is provided with internal coolant passages but permits the fabrication of ribbon-type conductors with a superconducting material in wire form.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
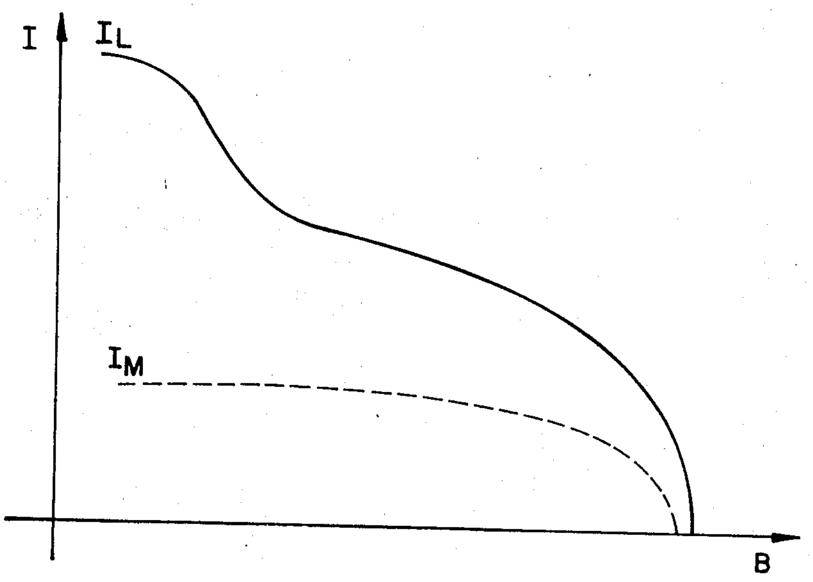
FIG. 1 represents the curves $I_L$ and $I_M$ as functions of the flux density B.

As mentioned above, FIG. 1 represents the theoretical curve of the critical current $I_L$ of a superconducting material and experimental curve of the maximum curve $I_M$ of a wound wire made of the same material as functions of the flux density.

Figure 3:
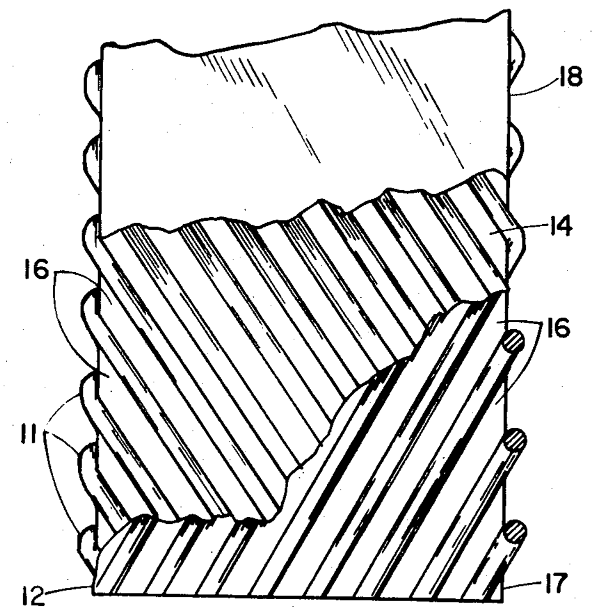
FIG. 3 is a top view with parts broken away of a conductor shown in FIG. 2.
Figure 2:
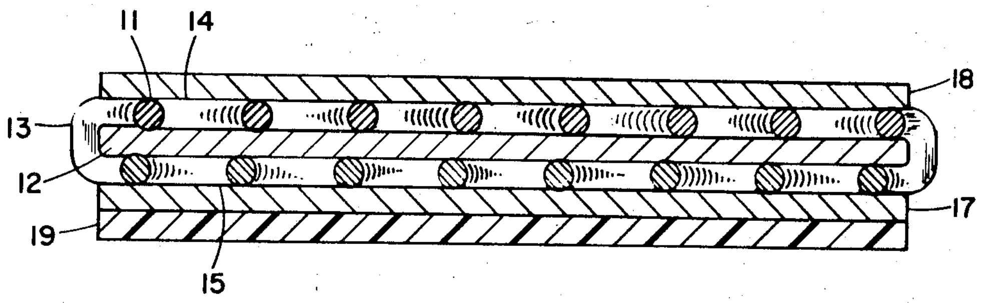
FIG. 2 is a cross-sectional end view on a greatly enlarged scale of a conductor according to the invention.

Attention is now directed to FIGS. 2 and 3 which illustrate a conductor according to the invention. As shown in FIGS. 2 and 3, at least one and preferably several wires 11 formed from a suitable superconductive material are simultaneously wound on a first ribbon 12 comprising a material having good thermal and electrical conductivity at room temperature, i.e., a resistivity at room temperature not substantially greater than that of aluminum at room temperature. Stated differently, such normal material should have a conductivity at normal temperatures of at least about $2.10^7$ ohm/meter, the ratio of the conductivity at low temperatures of a few degrees Kelvin to the conductivity at normal temperature, 20° C. for example, being higher than 50. Ribbon 12 may also, if desired, be comprised of the aforementioned normal material and superconductive material to define a composite conductor to provide for example additional current-carrying capacity.

It is important that the superconductive wire or wires 11 (which can have a rectangular as well as a circular configuration) be wound on the inner ribbon to define a plurality of turns 13 spaced one from another extending substantially the length of the ribbon 12. Preferably but not necessarily, the superconductive wire or wires 11 are soldered to the first inner ribbon 12.

Attention is now directed particularly to FIG. 3. In this figure, it will be seen that the portions of the turns in contact with the major side surface 14 of ribbon 12 extend (with reference to the bottom of FIG. 3) upwardly from right to left, whereas the portions of the turns in contact with the oppositely disposed major side surface 15 of ribbon 12 extend upwardly of from left to right, thereby defining in combination with the inner ribbon 12 and two outer ribbons 17 and 18 of normal material more fully described hereinafter, passages 16 at an angle to each other and to the longitudinal axis of the conductor. Accordingly, almost irrespective of the position of the conductor coolant flow passages are provided that are not horizontal and therefore greatly reduced the possibility of choking in these coolant passages resulting from vaporization of coolant in the passage. Since a large number of flow passages internally of the conductor are always disposed at an angle to the horizontal, liquid coolant converted to gaseous form due, for example, to the generation of heat in the conductor, can rise and thus escape from the interior of the conductor, thereby prevent the choking referred to hereinabove.

As shown in FIGS. 2 and 3 in the preferred embodiment, further outer ribbons 17 and 18 of normal material substantially identical to the inner ribbon 12 are disposed in intimate thermal and electrical contact with outermost periphery of substantially all of those portions of the turns disposed on the major side surfaces of the inner ribbon. The outer ribbons 17 and 18 may be soldered to the turns to facilitate heat transfer from the superconducting wires to the ribbons. In such case, the solder may be selected as an alloy of low melting point and good electrical conductivity at liquid helium temperature. A material suitable for this purpose is the eutectic mixture of tin and indium, a commercially available solder having a melting point of about 120° C. This eutectic mixture is superconductive at liquid helium temperature and low external magnetic field up to 2 kilogauss, a factor which enhances its suitability for present purposes.

A practical embodiment of a conductor in accordance with the invention was fabricated from 22 superconductive wires and three copper ribbons, the outer ribbons being approximately 0.500 inch wide by 0.015 inch thick and the inner ribbon being approximately 0.500 inch wide by 0.040 inch thick. Twenty-two composite superconductive wires were wound on the inner ribbon as shown and described hereinabove. The superconductive wires had a diameter of about 0.020 inch, were formed of copper clad niobium-titanium and were soldered to the ribbons with 50 percent lead-50 percent tin solder.

Magnetic field strengths and currents obtained in HE tests in a bath of liquid helium at 4.2° K. on the above-described conductor after being bent over a radius of 0.750 inch were:

| Field in kg. | Current in Amperes |
|---|---|
| 30.5 | 2,200 |
| 40 | 1,800 |
| 50 | 1,550 |

The theoretical maximum critical current of the above-described conductor was computed to be 1,628 amperes in a 50-kg. magnetic field (tests on one such superconductor provided a critical current of about 74 amperes in a 50-kg. field). The bent conductor tested at this field strength provided a critical current of 1,550 amperes, indicating a loss of only about 5 percent which was attributed to reading and instrument errors.

A conductor according to the invention as shown in FIGS. 2 and 3 can be wound into a coil without further treatment. However, if desired, the outer surface of one of the ribbons, such as for example ribbon 17 (see FIG. 2) may be coated with a conventional dielectric insulation 19.

Figure 4:
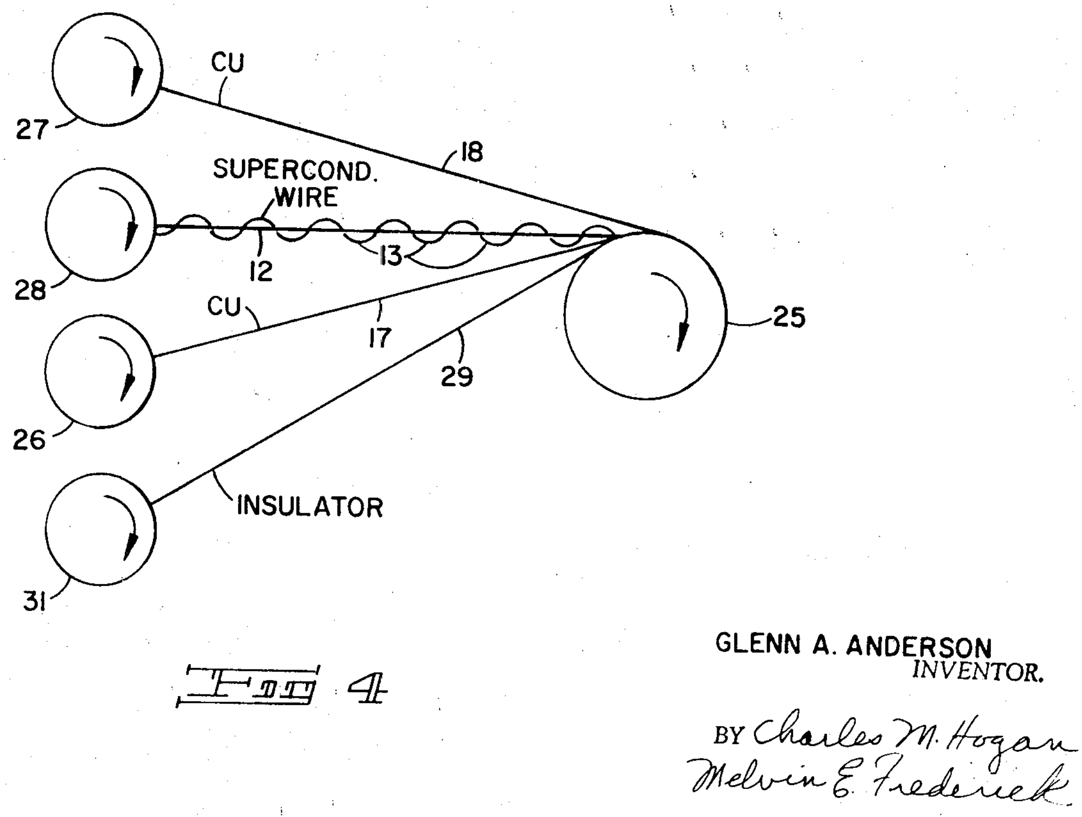
FIG. 4 is a pictorial view illustrating a method of manufacturing a conductor according to the invention and/or winding a coil incorporating a conductor according to the invention.

For simplicity, only the method shown in FIG. 4 for forming a conductor and/or a superconductive coil utilizing such a conductor will be described. Accordingly, referring now to FIG. 4, there is shown apparatus for forming a conductor according to the invention and/or a superconductive coil. As shown in FIG. 4, the conductor may be formed of a coil form 25 by supplying, for example, outer copper ribbons 17 and 18 from supply reels 26 and 27, the inner ribbon 12 with its associated turns 13 of superconductive wire from supply reel 28, and dielectric insulating material 29 such as for example Mylar from supply reel 31. The insulation which provides turn-to-turn electrical insulation may, as previously noted, be provided on the outer surface of ribbon 17.

A conductor in accordance with the invention not only provides a stabilized superconductive conductor that is simple and inexpensive to fabricate but one that is simultaneously provided with a large number of internal coolant passages. Further, a conductor fabricated in accordance with the invention provides an improved stabilized ribbon-type conductor which nonetheless is made with superconductive material in wire form rather than ribbon form.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In the method of forming a flat, elongated ribbon-type electrical conductor having first and second at least substantially flat major side surfaces defining its width dimension and third and fourth minor side surfaces defining its thickness dimension for use in winding magnet coils, the steps comprising:

a. winding a plurality of superconductive wires on a first ribbon having a longitudinal axis, said first ribbon comprising normal material having a resistivity at room temperature not substantially greater than that of aluminum at room temperature and which remains normal at superconducting temperatures, said superconductive wires being wound to define a plurality of turns spaced from one another surrounding said first ribbon and extending substantially the length of and in intimate thermal and electrical contact with said first ribbon;

b. providing a second ribbon substantially identical to said first ribbon covering and in intimate thermal and electrical contact with substantially only those portions of said turns disposed on one major side surface of said first ribbon;

c. disposing electrically nonconductive material on and covering the outer surface of said second ribbon; and d. providing a third ribbon substantially identical to said second ribbon in intimate thermal and electrical contact with substantially only the portions of said turns disposed on the other major side surface of said first ribbon, said turns being wound at an angle to the longitudinal axis of said first ribbon to define together with said first, second and third ribbons a large number of parallel passages for receiving a coolant internal of said conductor on opposite sides of said first ribbon, the passages on one side of said first ribbon being at an angle to the passages on the other side of said first ribbon whereby a large number of said passages will always be disposed at an angle to the horizontal irrespective of the position and orientation of said conductor.

2. In the method of winding a superconductive coil utilizing a flat elongated ribbon-type composite superconductive conductor having first and second substantially flat major side surfaces defining its width dimension, the steps comprising:

a. providing a first flat elongated ribbon of normal material having a longitudinal axis, said ribbon comprising normal material having a resistivity at room temperature not substantially greater than that of aluminum at room temperature and which remains normal at superconducting temperatures, said ribbon having wound thereon a plurality of superconductive wires defining a plurality of turns spaced one from another surrounding said first ribbon and extending substantially the length of and in intimate thermal and electrical contact with the major side surfaces of said first ribbon;

b. providing second and third elongated ribbons each substantially identical to said first ribbon per se;

c. providing an elongated fourth ribbon of electrically nonconductive material having a width equal to that of the major side surfaces of said first ribbon; and d. simultaneously winding said first, second, third and fourth ribbons onto a coil form to define said coil, said first ribbon being disposed between and separating said first and third ribbons whereby only those portions of each turn of said superconductive wires in contact with each major side surface of said first ribbon are in intimate thermal and electrical contact with respectively said second and third ribbons, said turns being wound at an angle to the longitudinal axis of said first ribbon to define together with said first, second and third ribbons a large number of parallel passages for receiving a coolant internal of said conductor on opposite sides of said first ribbon, the passages on one side of said first ribbon being at an angle to the passages on the other side of said first ribbon whereby a large number of said passages will always be disposed at an angle to the horizontal irrespective of the position and orientation of said conductor, said fourth ribbon being disposed on and covering the outer surface of said second ribbon.

* * * * *